United States Patent
Hikida et al.

(10) Patent No.: US 10,126,441 B1
(45) Date of Patent: Nov. 13, 2018

(54) NEUTRON POSITION DETECTOR

(71) Applicant: Toshiba Electron Tubes & Devices, Co., Ltd., Otawara-shi (JP)

(72) Inventors: Noriyuki Hikida, Otawara (JP); Kiyofumi Ookawa, Nasushiobara (JP); Kazuya Ishizawa, Ohtawara (JP)

(73) Assignee: Toshiba Electron Tubes & Devices Co., Ltd., Otawara-shi (JP)

( * ) Notice: Subject to any disclaimer, the term of this patent is extended or adjusted under 35 U.S.C. 154(b) by 0 days.

(21) Appl. No.: 15/904,834

(22) Filed: Feb. 26, 2018

(30) Foreign Application Priority Data

May 15, 2017 (JP) .................. 2007-096171

(51) Int. Cl.
G01T 3/00 (2006.01)
G01T 1/185 (2006.01)
H01J 47/12 (2006.01)

(52) U.S. Cl.
CPC .............. G01T 3/008 (2013.01); G01T 1/185 (2013.01); *H01J 47/12* (2013.01)

(58) Field of Classification Search
CPC .................................. G01T 1/185; H01J 47/12
USPC ......................................................... 250/374
See application file for complete search history.

(56) References Cited

U.S. PATENT DOCUMENTS

2006/0017000 A1* 1/2006 Martoff .................. G01T 1/2935
250/390.02
2011/0114848 A1* 5/2011 Frank ........................ G01T 1/18
250/374

FOREIGN PATENT DOCUMENTS

JP 2003-167062 A 6/2003
JP 2009-198439 A 9/2009

OTHER PUBLICATIONS

Japanese Office Action dispatch dated Jul. 12, 2017 issued in Application No. 2017-096171 with English translation, 6 pages.
Doumas, A., et al., "A Monto Carlo simulation comparing hydrocarbons and stopping gases for position sensitive neutron detectors", Nuclear Instruments and Methods in Physics Research A, vol. 612, 2009, pp. 149-154.
Desai, S.S., et al., "Characterization of one-dimensional position sensitive detectors with improved efficiency and position resolution for neutron spectrometers", Review of Scientific Instruments, vol. 78, 2007, pp. 023304-1-023304-6.
S.S. Desai et al "On studies of $^3$He and isobutene mixture as neutron proportional counter gas", Nuclear Instruments and Methods in Physics Research Section A, Dec. 19, 2005, vol. 557, Issue 2, p. 607 to 614.

(Continued)

*Primary Examiner* — Kenneth J Malkowski
(74) *Attorney, Agent, or Firm* — Oblon, McClelland, Maier & Neustadt, L.L.P.

(57) ABSTRACT

According to one embodiment, a neutron position detector includes a gas including a $^3$He gas and an additive gas. The gas has a gas composition being set so that a total of ranges of a proton and a tritium in the gas is 2.0 to 2.7 mm. The partial pressures are in an extent surrounded by a first gas composition point of the $^3$He gas of 5 atm and the additive gas of 1.6 atm, a second gas composition point of the $^3$He gas of 5 atm and the additive gas of 2.3 atm, a third gas composition point of the $^3$He gas of 20 atm and the additive gas of 0.6 atm, and a fourth gas composition point of the $^3$He gas of 20 atm and the additive gas of 1.3 atm.

4 Claims, 5 Drawing Sheets

(56) References Cited

OTHER PUBLICATIONS

Japanese Notification of Reasons for Refusal issued Jun. 30, 2017 in Patent Application No. 2017-096171 with English translation, 6 pages.
Japanese Decision to Grant a Patent issued Sep. 7, 2017 in Patent Application No. 2017-096171 with English translation, 5 pages.

* cited by examiner

| | | COMPARATIVE EXAMPLE | THE EMBODIMENT | | | | | | |
|---|---|---|---|---|---|---|---|---|---|
| PSD | OUTPUT CHARGE [pC] | ~1 | 2~5 | | | | | | |
| | OPERATION VOLTAGE [kV] (VOLTAGE AT WHICH THE ABOVE OUTPUT CHARGE IS OBTAINED) | 1.3~1.8 | 2.0~2.5 | | | | | | |
| | ³He GAS PARTIAL PRESSURE [atm] | 5~20 | 5~20 | | | | | | |
| | ADDITIVE GAS (CF₄) PARTIAL PRESSURE [atm] | LESS THAN 0.2 TO 0.9 | 0.9~2.3 | | | | | | |
| | BREAKDOWN VOLTAGE | NOT LESS THAN OPERATION VOLTAGE+300 V | ~2.9kV | | | | | | |
| CIRCUIT SYSTEM | AD CONVERTER | ELEMENT 12 bit, SUBSTANTIAL 10 bit (=1024) | ELEMENT 14 bit, SUBSTANTIAL 12 bit (=4096) | | | | | | |
| | ELEMENT BREAKDOWN VOLTAGE [kV] | 2~2.5 | 3 | | | | | | |
| APPARATUS TOTAL | POSITION RESOLUTION | NOT LESS THAN 4 mm | NOT MORE THAN 2 mm | | | | | | |
| PSD EXAMPLE | EXAMPLE No. | EXAMPLE 1 | EXAMPLE 2 | EXAMPLE 3 | EXAMPLE 4 | EXAMPLE 5 | EXAMPLE 6 | | |
| | PSD DIAMETER [mm] | 8 | 12.7 | 25.4 | 8 | 8 | 8 | | |
| | PSD SENSITIVE LENGTH [mm] | 1000 | 800 | 2900 | 1000 | 1000 | 1000 | | |
| | ³He GAS PARTIAL PRESSURE [atm] | 6 | 20 | 9.6 | 10 | 7 | 14 | | |
| | ADDITIVE GAS (CF₄) PARTIAL PRESSURE [atm] | 0.83 | 0.52 | 0.315 | 1.6 | 1.6 | 1.33 | | |
| | OPERATION VOLTAGE [kV] | 1.5 | 1.8 | 1.7 | 2.37 | 2.28 | 2.325 | | |
| | OUTPUT CHARGE [pC] | ~5 | ABOUT 1 | 2.22 | 0.94 | ABOUT 3 | 2.406 | | |
| | p+T RANGE (TOTAL) [mm] | 4.448 | 2.903 | 5.486 | 2.414 | 2.656 | | | |
| | NUCLEAR REACTION POSITION~ CHARGE CENTROID DISTANCE [mm] | 1.180 | 0.797 | 1.500 | 0.640 | 0.700 | 0.644 | | |
| | CONTRIBUTION OF RANGE TO POSITION RESOLUTION [mm] | 1.44 | 1.17 | 2.22 | 0.94 | 1.01 | 0.94 | | |
| | ACTUAL POSITION RESOLUTION [mm] | ~5 | ~5 | ~20 | ~1.6 | ~1.6 | ~1.6 | | |
| | RATIO OF POSITION RESOLUTION TO PSD SENSITIVE LENGTH [%] | ~0.5 | ~0.6 | ~0.7 | ~0.2 | ~0.2 | ~0.2 | | |

NEUTRON POSITION DETECTOR

CROSS-REFERENCE TO RELATED APPLICATIONS

This application is based upon and claims the benefit of priority from Japanese Patent Application No. 2017-096171, filed on May 15, 2017; the entire contents of which are incorporated herein by reference.

FIELD

Embodiments of the invention relate to a neutron position detector detecting an incidence position of neutron.

BACKGROUND

A neutron position detection apparatus is used for application or the like to investigation of characteristics of a specimen, for example, in an acceleration facility by irradiating the specimen to be investigated with neutron and detecting scattering of the neutron.

The neutron position detection apparatus includes a neutron position detector which is a position sensitive proportional counter for neutron detection (PSD), and a processing circuit calculating the incidence position of the neutron by processing an output charge from the neutron position detector.

The neutron position detector includes a tubular envelope serving as a cathode, an anode is disposed on an axis of the envelope, and a gas including a $^3$He gas and an additive gas is enclosed in the envelope. When a neutron is incident on the envelope, $^3$He in the gas reacts with the neutron to produce a proton and a tritium, and the proton and the tritium jump into the gas to ionize a surrounding gas and collects the ionized charge to the anode. The processing circuit detects the incidence position of the neutron on the basis of the output charge from both ends of the anode.

It is desired that a position resolution which is detection accuracy of the incidence position of the neutron is improved in the neutron position detection apparatus.

DETAILED DESCRIPTION

According to one embodiment, a neutron position detector includes a tubular envelope serving as a cathode, an anode disposed on an axis in the envelope, and a gas including a $^3$He gas and an additive gas. The gas is enclosed in the envelope. The gas has a gas composition being set so that a total of ranges of a proton and a tritium in the gas produced by a reaction of a neutron incident into the envelope and the $^3$He gas is 2.0 to 2.7 mm. The partial pressures are in an extent surrounded by a first gas composition point of the partial pressure of the $^3$He gas of 5 atm and the partial pressure of the additive gas of 1.6 atm, a second gas composition point of the partial pressure of the $^3$He gas of 5 atm and the partial pressure of the additive gas of 2.3 atm, a third gas composition point of the partial pressure of the $^3$He gas of 20 atm and the partial pressure of the additive gas of 0.6 atm, and a fourth gas composition point of the partial pressure of the $^3$He gas of 20 atm and the partial pressure of the additive gas of 1.3 atm.

In the following, one embodiment will be described with reference to the drawings.

Figure 1:
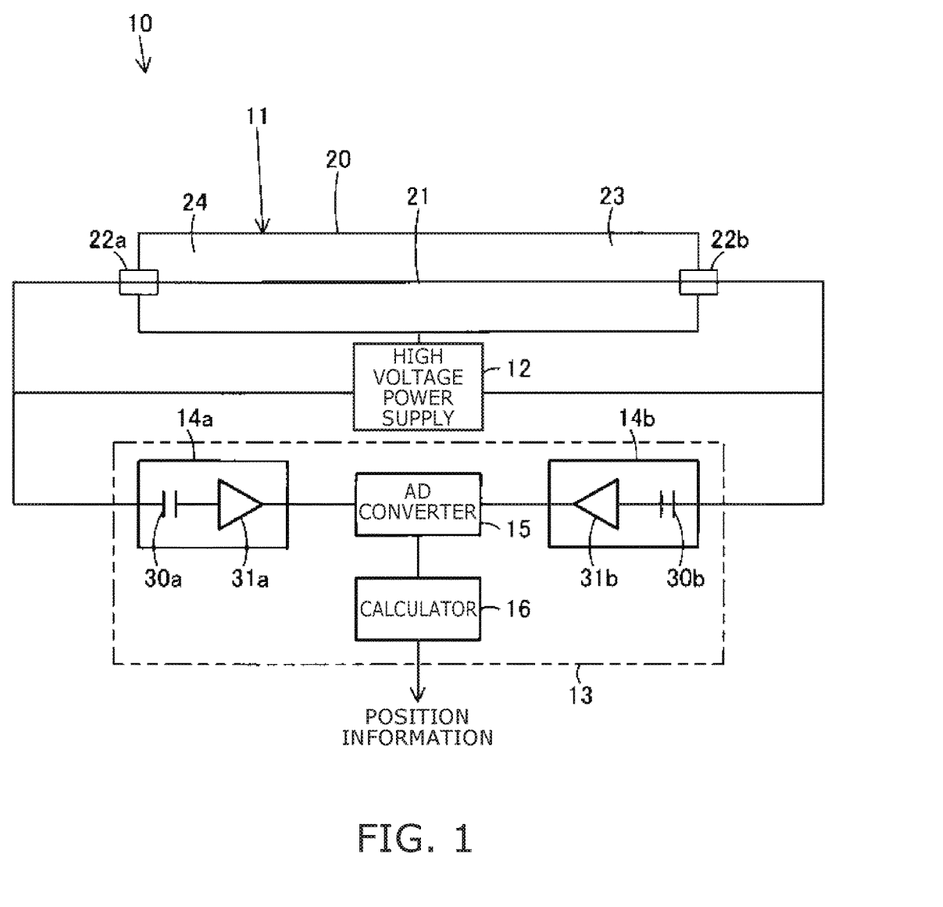
FIG. 1 is a configurational view a neutron position detection apparatus based on a neutron position detector showing one embodiment.

As shown in FIG. 1, a neutron position detection apparatus 10 includes a neutron position detector 11, a high voltage power supply 12, and a processing circuit 13. The processing circuit 13 includes preamplifiers 14a, 14b, an AD converter 15, and a calculator 16 or the like.

The neutron position detector 11 is a one dimensional position sensitive type proportional counter for neutron detection (PSD). The neutron position detector 11 includes a tubular envelope 20, an anode 21 disposed at an axis of the envelope 20, terminal portions 22a, 22b provided on both ends of the envelope 20, and a gas enclosed in the envelope 20.

The envelope 20 is tube-shaped, is long in an axis direction, and both ends are closed. A closed space 24 is provided inside the envelope 20.

The anode 21 is a resistive core wire having a constant resistance value per unit length. The anode 21 is disposed along the axis in the envelope 20, the both ends are coupled to the terminal ends 22a, 22b, and are electrically connected.

The terminal portions 22a, 22b are in an insulating state to the envelope 20, and are arranged on both ends of the envelope 20. The both ends of the anode 21 are coupled to the terminals 22a, 22b, and electrically connected.

The gas 23 is enclosed in the closed space 24 in the envelope 20. The gas 23 includes the $^3$He gas and the additive gas. The partial pressure of the $^3$He gas is set arbitrarily depending on specification of a detection efficiency of the neutron, and is set in an extent roughly from 5 atm to 20 atm. The $CF_4$ gas, a $CO_2$ gas, a $CH_4$ gas or the like are used for the additive gas. In general, a molecular gas is added as a quench gas in the proportional counter, however in the embodiment, the partial pressure of the additive gas is set higher than a conventional product so that the ranges of the proton and the tritium produced by a nuclear reaction between the neutron and the $^3$He gas in the gas 23 becomes short. The composition of the gas 23, namely the partial pressure of the $^3$He gas and the partial pressure of the additive gas are set so that the total of the ranges of the proton and the tritium in the gas 23 is in an extent from 2.0 mm to 2.7 mm.

The high voltage power supply 12 applies the operation voltage between the envelope 20 which is the cathode and the anode 21. The operation voltage is set so that the output charge from the anode 21 is 2 pC to 5 pC higher than the conventional product. In the conventional product, the operation voltage is set to be 1.3 kV to 1.8 kV so that the output charge is about 1 pC, however in the embodiment, as described above, the partial pressure of the additive gas is set higher than the conventional product, and the operation voltage is set so that the output charge is high, and thus the operation voltage is set to be in an extent from 2.0 kV to 2.5 kV.

The preamplifiers 14a, 14b of the processing circuit 13 convert the output charges from both ends of the neutron position detector 11 (hereinafter, referred to as detector both end) to an electrical signal, respectively and output. The preamplifiers 14a, 14b include coupling capacitors 30a, 30b which cut a high voltage component applied to the neutron position detector 11, and operational amplifiers 31a, 31b or the like converting the output charges having the cut high voltage component to predetermined electrical signals.

The AD converter 15 converts electrical signals (analog signal) at the detector both ends output from the preamplifiers 14a, 14b to digital signals (waveform signal), respectively. An element having a resolution not less than 14 bit is used for the AD converter 15. For example, an element having a resolution not less than 14 bit may be used for the AD converter 15.

The calculator 16 determines wave heights from a wave form data of the electrical signals of the detector both ends digitalized by the AD converter 15, respectively, and on the basis of these wave heights, calculates the incidence position of the neutron in the axis direction of the neutron position detector 11.

The operation of the neutron position detection apparatus will be described.

The operation voltage is applied between the envelope 20 which is the cathode and the anode 21 by the high voltage power supply 12.

Figure 2A:
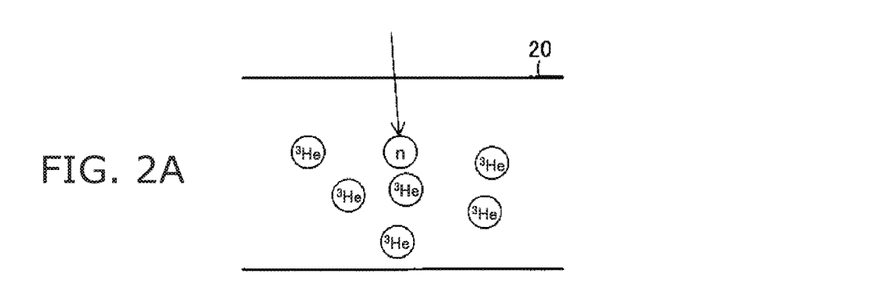
FIGS. 2A, 2B, and 2C are description views describing the operation from neutron incidence to ionization in the same as above neutron position detector in sequence of 2A, 2B, and 2C.
Figure 2B:
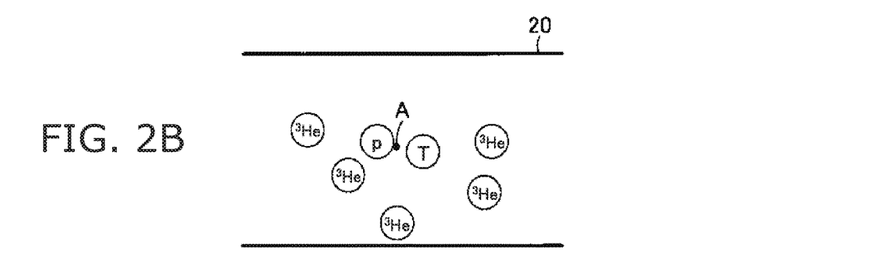

As shown in FIGS. 2A and 2B, when the neutron n is incident in the envelope 20, the neutron n reacts with the $^3$He gas, and the proton p and the tritium T are produced. A shown in FIG. 2B is a position where the nuclear reaction occurs, and is a position where the proton p and the tritium T are produced.

Figure 2C:
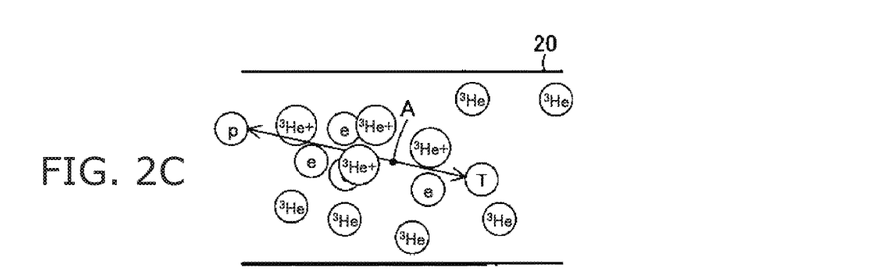

As shown in FIG. 2C, the proton p has an energy of about 574 keV, the tritium T has an energy of 191 keV, the proton p and the tritium T jump into the gas 23 in mutually opposite directions, and lose the energy gradually by collisions with atoms/molecules of the surrounding gas 23 to stop. When the proton p and the tritium T collide with the gas 23, a portion of the energy of the proton p and the tritium T is given to the gas 23 and the gas is ionized, and a charge e is produced.

The produced charge e is collected to the anode 21 by an electric field formed between the envelope which is the cathode and the anode 21. Thereby, the output charge of a ratio depending on each distance from a collection point of the charge e at the anode 21 to both ends of the anode 21 is output from the both ends of the anode 21, respectively. When the charge e recombines the anode 21, an ultraviolet ray which influences the operation of the neutron position detector 11 is produced, however the ultraviolet ray is absorbed by the additive gas and the operation of the neutron position detector 11 is stabilized.

The output charges from the detector both ends (both ends of the anode 21) are converted to the electrical signals by the preamplifiers 14a, 14b, and the electrical signals at the detector both ends output from the preamplifiers 14a, 14b are converted to digital signals (waveform signal) by the AD converter 15.

The calculator 16 determines the wave heights from the waveform data of the electrical signals at detector both ends digitalized by the AD converter 15, respectively, and on the basis of a ratio of the wave heights, the incidence position of the neutron in the axis direction of the neutron position detector 11 is calculated.

The position resolution of the neutron position detection apparatus 10 is desired to be improved. The position resolution is a spread width of a position distribution determined assuming that numerous neutrons are incident on one point of the neutron position detector 11.

Figure 3:
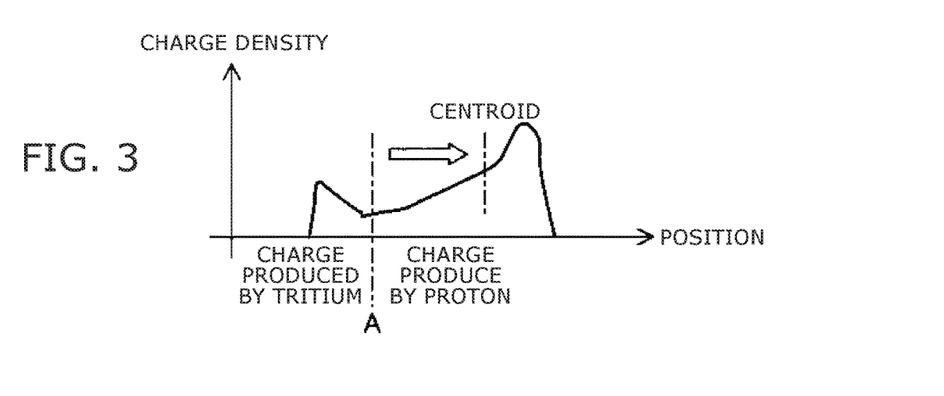
FIG. 3 is a graph view showing a relationship between the position and density of the charge produced in the same as above neutron position detector.

As shown in FIG. 2C, the charge e is produced in an extent from the position A where the proton p and the tritium T are produced to the stop position. Since the proton p and the tritium T do not have the same mass and energy, the extent from the position A where the nuclear reaction occurs to the stop position are different each other. Therefore, as shown in FIG. 3, the centroid of the charge e produced by the proton p and the tritium T is near to the proton p side from the position A where the nuclear reaction occurs. Therefore, the position A where the nuclear reaction occurs and the centroid of the charge e are shifted. Jumping out directions of the proton p and the tritium T are random.

From the above, it results in that even if assuming that the numerous neutrons are incident on one point of the neutron position detector 11, the centroid of the charge e produced in the gas 23 does not form one point, but spreads in an extent correlated with the ranges of the proton p and the tritium T in the gas 23.

In the neutron position detection apparatus 10 using the neutron position detector 11, the centroid of the charge e is determined in order to detect the incidence position of the neutron, and thus as the ranges of the proton p and the tritium T in the gas 23 are large, the detection accuracy of the incidence position of the neutron, namely, the position resolution is influenced more.

Therefore, it is favorable to shorten the ranges of the proton p and the tritium T in the gas 23 in order to improve the position resolution. As a result of performing the simulation, for improving the position resolution of the neutron position detector 11 to be not more than 2 mm, it is found that unless the total of the ranges of the proton p and the tritium T in the gas 23 becomes not more than 2.7 mm, the position resolution of the neutron position detector 11 cannot be improved to be not more than 2 mm.

In order to shorten the ranges of the proton p and the tritium T on the gas 23, there is a method making the partial pressure of the additive gas increase. As the partial pressure of the additive gas is increased, the ranges of the proton p and the tritium T on the gas 23 can be shorten more, however as the partial pressure of the additive gas is increased, the operation voltage necessary for the neutron position detector 11 is higher. If the partial pressure of $CF_4$ which is the additive gas is increased by 1 atm, the operation voltage increases roughly by 500 to 600 V, in the case where the output charge from the neutron position detector 11 is the same.

However, if the operation voltage of the neutron position detector 11 becomes high, a problem of a breakdown voltage of the neutron position detector 11 and the processing circuit 13 occurs, such as a fear of occurrence of discharge between the envelope 20 and the anode 21, or a fear of exceeding the breakdown voltage of the element used for the processing circuit 13.

Furthermore, in order to improve the position resolution, it is preferable that the output charges from the both ends of the neutron position detector 11 are large. This is because that the anode 21 formed of the resistive core wire produces a relatively large thermal noise, and if the output charge is small, S/N ratio is low and the position resolution is hard to be improved.

In the embodiment, the partial pressures of the $^3$He gas and the additive gas are set so that the total of the ranges of the proton p and the tritium T in the gas 23 is in an extent from 2.0 mm to 2.7 mm, and the operation voltage is set to be in an extent from 2.0 KV to 2.5 KV so that the output charge from the neutron position detector 11 is 2 pC to 5 pC, and then the position resolution of the neutron position detector 11 is set to be not more than 2 mm. By configuring like this, the position resolution can be improved under consideration of the breakdown voltages of the neutron position detector 11 and the processing circuit 13.

Figure 4:
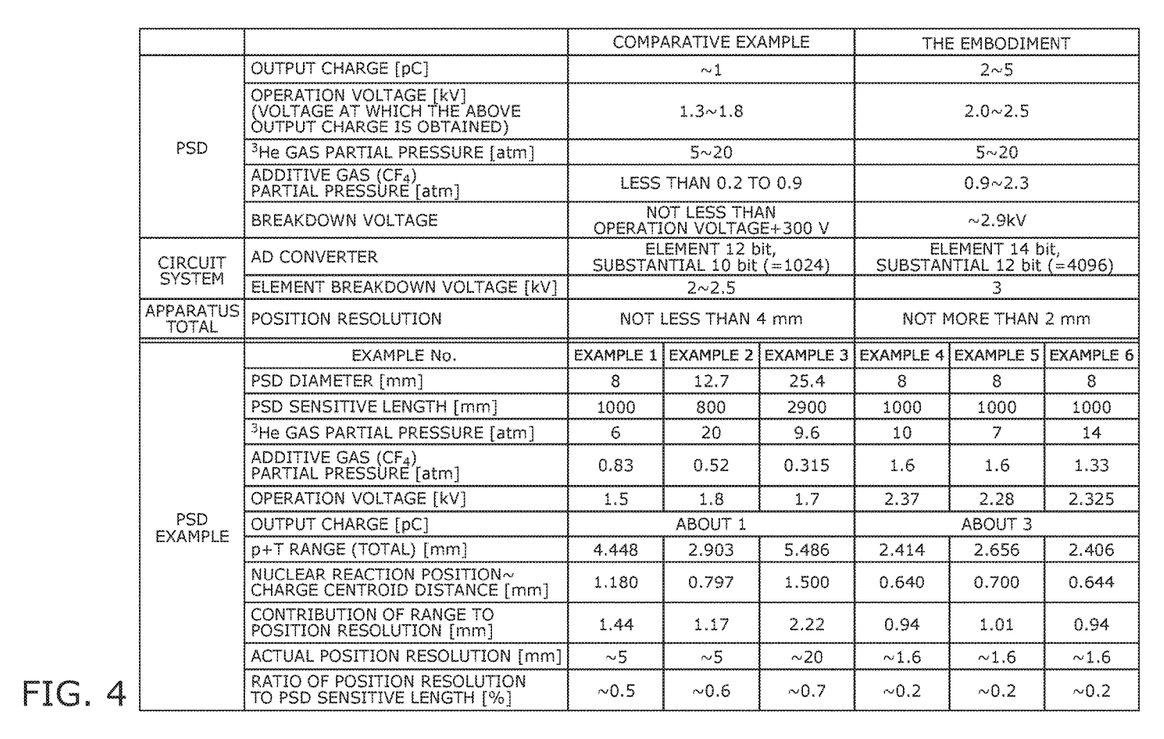
FIG. 4 is a table showing characteristics of the neutron position detection apparatus of the embodiment and the characteristics of a comparative example.

FIG. 4 shows characteristics of the neutron position detection apparatus 10 of the embodiment and characteristics of a comparative example. In FIG. 4 the neutron position detector 11 is described as PSD. The respective constitutions of the comparative example are described by describing corresponding numerals in parentheses.

First, the comparative example is described. The partial pressure of the $^3$He gas of the neutron position detector (11) is 5 atm to 20 atm (being set depending on the specification of the detection efficiency of the neutron), the partial pressure of $CF_4$ which is the additive gas is 0.2 atm to 0.9 atm (the case of the partial pressure of the $^3$He gas being 6 atm, also in this case less than 0.9 atm), the operation voltage of the neutron position detector (11) is 1.3 kV to 1.8 kV, the output charge from the neutron position detector (11) is about 1 pC, the breakdown voltage of the neutron position detector (11) is not less than the operation voltage+300 V. An element having the resolution of 12 bit is used for the AD converter (15), and substantial bit number used for AD conversion is 10 bit (resolution=1024). An element having the breakdown voltage of 2 kV to 2.5 kV is used for the processing circuit (13).

In the example constituted like this, the position resolution of the neutron position detector (11) is not less than 4 mm.

The comparative example is shown in an example 1, an example 2 and an example 3. Diameters and sensitive lengths, the partial pressures of the $^3$He gas, the partial pressures of $CF_4$ which is the additive gas, the operation voltages of the neutron position detector (11) in the example 1, the example 2 and the example 3 are different, respectively, however in all of the example 1, the example 2 and the example 3, the output charges from the neutron position detector (11) are regulated to be about 1 pC.

In all of the example 1, the example 2 and the example 3, the partial pressures of $CF_4$ which is the additive gas are in an extent from 0.2 atm to 0.9 atm (less than 0.9 atm), and the operation voltages of the neutron position detector (11) are in an extent from 1.3 kV to 1.8 kV. In this case, the total of the ranges of the proton p and the tritium T in the gas (23) is not less than 2.9 mm (2.903 mm in the example 2 is shortest), and the output charge from the neutron position detector (11) is about 1 pC.

The ranges of the proton p and the tritium T in the gas (23) is long, the output charge from the neutron position detector (11) is small and the S/N ratio is low, and thus the actual position resolution is not less than 5 mm.

Next, the neutron position detection apparatus 10 of the embodiment is described.

The partial pressure of the $^3$He gas of the neutron position detector 11 is 5 atm to 20 atm (being arbitrarily set depending on the specification of the detection efficiency of the neutron), the partial pressure of $CF_4$ which is the additive gas is 0.9 atm to 2.3 atm (the partial pressure of $CF_4$ which is the additive gas is set on the basis of the partial pressure of the $^3$He gas so that the total of the ranges of the proton p and the tritium T in the gas 23 is in an extent from 2.0 mm to 2.7 mm), the operation voltage of the neutron position detector 11 is 2.0 kV to 2.5 kV, the output charge from the neutron position detector 11 is 2 pC to 5 pC, and the breakdown voltage of the neutron position detector 11 is not more than 2.9 kV. A element having the resolution of 14 bit is used for the AD converter 15, and the substantial bit number used for the AD conversion is 12 bit (resolution=4096). An element having the breakdown voltage of 3 kV is used for the processing circuit 13.

In the neutron position detector 11 of the embodiment configured like this, the position resolution of the neutron position detector 11 is improved to be not more than 2 mm.

The specific configurations of the neutron position detector 11 of the embodiment are shown in an example 4, an example 5 and an example 6. The partial pressures of the $^3$He gas, the partial pressures of $CF_4$ and the operation voltages in the example 4, the example 5 and the example 6 are different, however in all of the example 4, the example 5 and the example 6, the output charge is regulated to be about 3 pC.

In all of the example 4, the example 5 and the example 6, the partial pressure of $CF_4$ which is the additive gas is in an extent from 0.9 atm to 2.3 atm, and the operation voltage of the neutron position detector 11 is in an extent from 2.0 kV to 2.5 kV. In this case, the total of the ranges of the proton p and the tritium T in the gas 23 is in an extent from 2.0 mm to 2.7 mm (2.656 mm in the example 5 is longest), and the output charge from the neutron position detector 11 is about 3 pC.

As a result of performing the simulation, a distance from the position A where the nuclear reaction occurs to the centroid of the charge e becomes shorter than before, and the contribution (influence) of the ranges of the proton p and the tritium T in the gas 23 to the position resolution becomes smaller than before.

The partial pressure of $CF_4$ which is the additive gas is in an extent from 0.9 atm to 2.3 atm higher than before, and the total of the ranges of the proton p and the tritium T in the gas 23 can be shorter than before to be in an extent from 2.0 mm to 2.7 mm. Thereby, the actual position resolution can be improved to be 1.6 mm not more than 2 mm.

In the embodiment shown in FIG. 4, the partial pressure of $CF_4$ which is the additive gas is set to be not less than 0.9 atm, and the operation voltage of the neutron position detector 11 is set to be not less than 2.0 kV so that the total of the ranges of the proton p and the tritium T in the gas 23 is not more than 2.7 mm and the output charge from the neutron position detector 11 is not less than 2 pC, however for further improvement of the position resolution, the partial pressure of $CF_4$ which is the additive gas should be made further higher and the operation voltage of the neutron position detector 11 should be made further higher.

However, if the partial pressure of $CF_4$ which is the additive gas is made excessively high, the operation voltage of the neutron position detector 11 becomes excessively high, it becomes difficult to actualize due to a problem of breakdown voltages of the neutron position detector 11 and the processing circuit 13, such as a fear of occurrence of discharge between the envelope 20 and the anode 21, or a fear that the operation voltage exceeds the breakdown voltage of the element used for the processing circuit 13.

Therefore, the realistic upper limit of the operation voltage under consideration of the breakdown voltages of the neutron position detector 11 and the processing circuit 13 like this is favorable to be approximately 2.5 kV, in the case where a margin to the breakdown voltage of 2.9 kV of the neutron position detector 11 is 0.4 kV.

The upper limits of the partial pressures of the $^3$He gas and CF$_4$ which is the additive gas are determined from the upper limit of the operation voltage of the neutron position detector 11, the lower limit of the total of the ranges of the proton p and the tritium T in the gas 23 is 2.0 mm, and further the upper limit of the output charge from the neutron position detector 11 is 5 pC.

Therefore, considering comprehensively the improvement of the position resolution and the breakdown voltages of the neutron position detector 11 and the processing circuit 13, it is favorable that the total of the ranges of the proton p and the tritium T in the gas 23 is in an extent from 2.0 mm to 2.7 mm, the operation voltage of the neutron position detector 11 is in an extent from 2.0 kV to 2.5 kV, the output charge from the neutron position detector 11 is in an extent from 2 pC to 5 pC.

If the total of the ranges of the proton p and the tritium T in the gas 23 is shorter than 2.0 mm, the partial pressures of the $^3$He gas and CF$_4$ which is the additive gas must be higher, and thus the operation voltage is higher and the problem of the breakdown voltages of the neutron position detector 11 and the processing circuit 13 occurs. If it is longer than 2.7 mm, the position resolution of the neutron position detector 11 cannot be improved to be not more than 2 mm. Therefore, the total of the ranges of the proton p and the tritium T in the gas 23 is favorable to be in an extent from 2.0 mm to 2.7 mm.

If the operation voltage of the neutron position detector 11 is smaller than 2.0 kV, sufficiently large output charge cannot be output from the neutron position detector 11 and the S/N ratio is low, and thus the position resolution cannot be improved. If it is larger than 2.5 kV, the problem of the breakdown voltages of the neutron position detector 11 and the processing circuit 12 occurs. Therefore, the operation voltage of the neutron position detector 11 is favorable to be in an extent from 2.0 kV to 2.5 kV.

Figure 5:
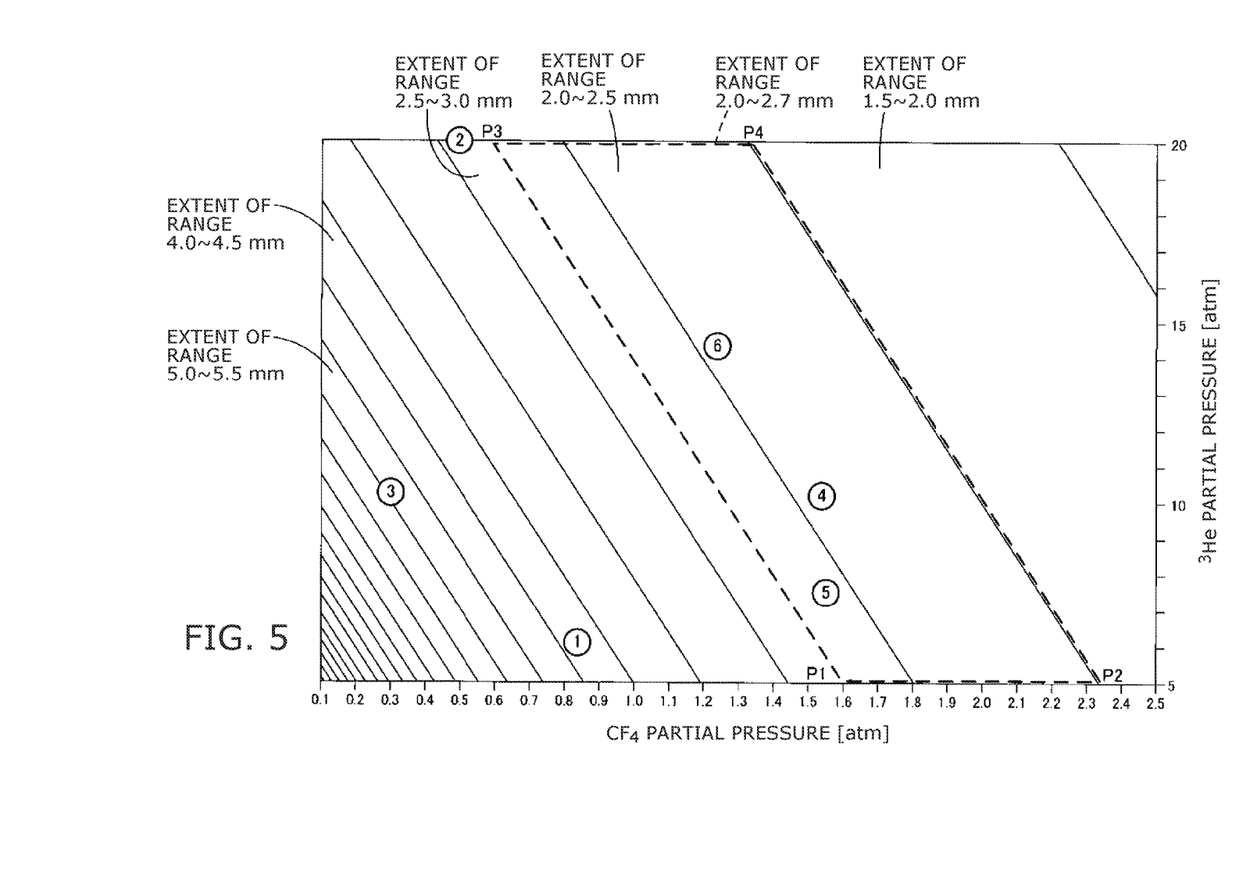
FIG. 5 is a graph view showing relationships between partial pressures of the $^3$He gas and a $CF_4$ gas and a total of ranges of the proton and the tritium in the gas.

FIG. 5 is a graph view showing the relationships between the partial pressures of the $^3$He gas and the CF$_4$ gas and the total of the ranges of the proton p and the tritium T in the gas 23. Circled numbers shown in FIG. 5 correspond to the examples 1 to 6 described above, respectively.

As shown in FIG. 5, the extent (broken line extent) of the range from 2.0 mm to 2.7 mm is set by a gas composition due to combination of the partial pressure of the $^3$He gas and the partial pressure of the CF$_4$ gas. That is, the gas composition of the gas 23 having the range from 2.0 mm to 2.7 mm is in an extent surrounded by a first gas composition point P1 of the partial pressure of the $^3$He gas of 5 atm and the partial pressure of the additive gas of 1.6 atm, a second gas composition point P2 of the partial pressure of the $^3$He gas of 5 atm and the partial pressure of the additive gas of 2.3 atm, a third gas composition point P3 of the partial pressure of the $^3$He gas of 20 atm and the partial pressure of the additive gas of 0.6 atm, and a fourth gas composition point P4 of the partial pressure of the $^3$He gas of 20 atm and the partial pressure of the additive gas of 1.3 atm. The examples 4 to 6 of the embodiment exist in the extent of the range from 2.0 mm to 2.7 mm, and the conventional examples 1 to 3 exist in a region where a range is longer than the extent of the range from 2.0 mm to 2.7 mm.

Figure 6:
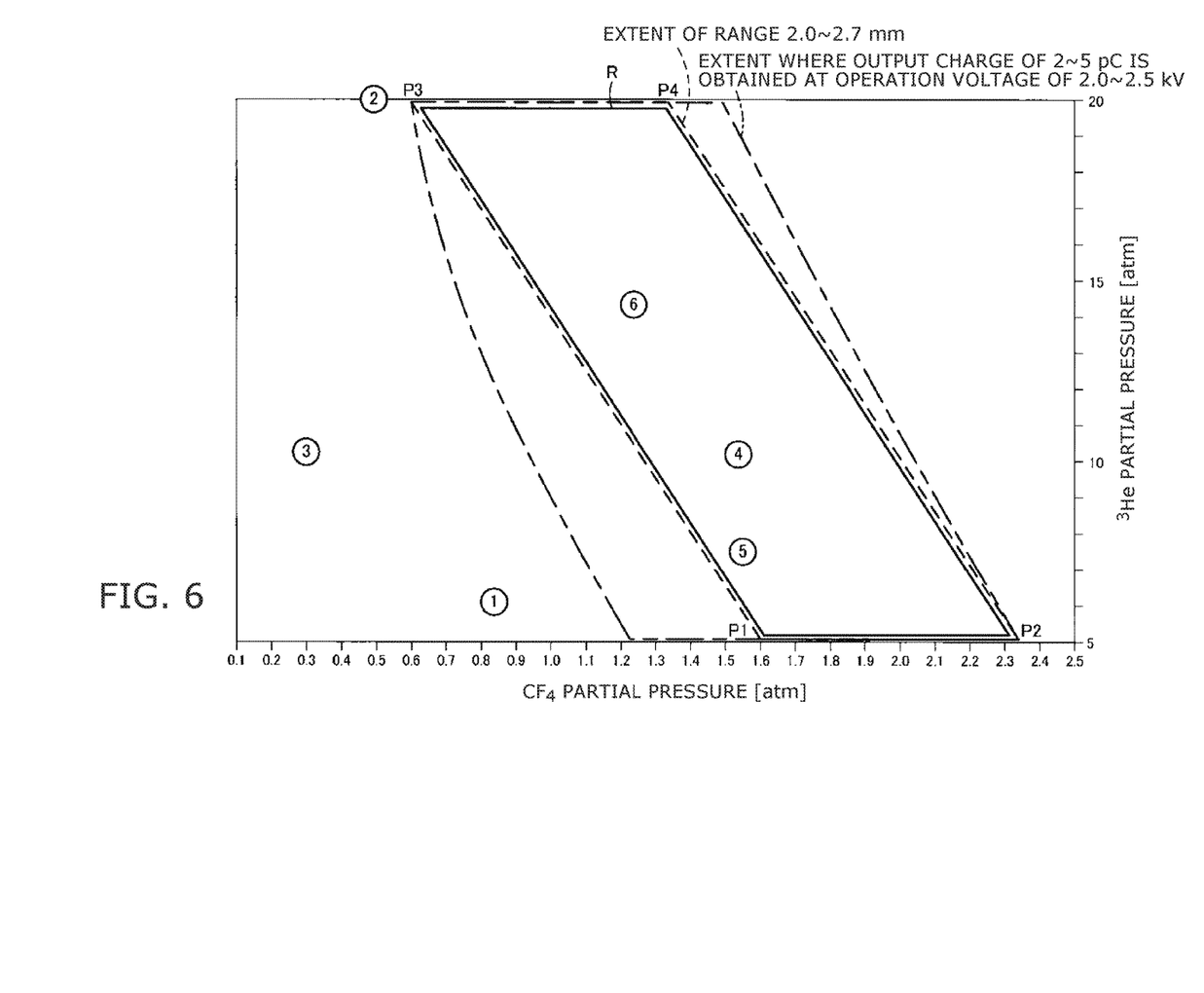
FIG. 6 is a graph view showing relationships among the partial pressures of the $^3$He gas and a $CF_4$ gas, the total of ranges of the proton and the tritium in the gas, and the operation voltage at which the output charge of 2 pC to 5 pC is obtained.

FIG. 6 is a graph view showing the relationships among the partial pressures of the $^3$He gas and the CF$_4$ gas, the total of the ranges of the proton p and the tritium T in the gas 23, and the operation voltage at which the output charge of 2 pC to 5 pC is obtained. FIG. 6 shows the extent (broken line extent) where the range from 2.0 mm to 2.7 mm is obtained, and the extent (dash-dotted line) where the output charge from 2 pC to 5 pC is obtained by prescribed operation voltage in the extent from 2.0 kV to 2.5 kV. FIG. 6 shows positions of the gas compositions of the examples 1 to 3 having the output charge of 1 pC, and positions of the gas compositions of the examples 4 to 6 having the output charge of 3 pC.

The composition of the gas 23, namely, the partial pressures of the $^3$He gas and the CF$_4$ gas are set so that the extent (solid line extent) R formed of the extent where the range from 2.0 mm to 2.7 mm is obtained and where the output charge from 2 pC to 5 pC is obtained by the operation voltage from 2.0 kV to 2.5 kV is obtained.

As described above, according to the neutron position detector 11, the partial pressures of the $^3$He gas and the additive gas are set so that the total of the ranges of the proton p and the tritium T in the gas 23 is in the extent from 2.0 mm to 2.7 mm, and thus the position resolution can be improved under consideration of the breakdown voltages of the neutron position detector 11 and the processing circuits 13.

The partial pressure of the additive gas is favorably from 0.6 atm to 2.3 atm as shown in FIG. 6, and the extent is favorable to improve the position resolution under consideration of the breakdown voltages of the neutron position detector 11 and the processing circuit 13.

Otherwise, the gas composition of the gas 23 having the range from 2.0 mm to 2.7 mm is favorably in the extent surrounded by the first gas composition point P1 of the partial pressure of the $^3$He gas of 5 atm and the partial pressure of the additive gas of 1.6 atm, the second gas composition point P2 of the partial pressure of the $^3$He gas of 5 atm and the partial pressure of the additive gas of 2.3 atm, the third gas composition point P3 of the partial pressure of the $^3$He gas of 20 atm and the partial pressure of the additive gas of 0.6 atm, and the fourth gas composition point P4 of the partial pressure of the $^3$He gas of 20 atm and the partial pressure of the additive gas of 1.3 atm. The extent is favorable to improve the position resolution under consideration of the breakdown voltages of the neutron position detector 11 and the processing circuit 13.

Moreover, since the output charge from the neutron position detector 11 is set large to be from 2 pC to 5 pC, the S/N ratio is improved and the position resolution can be improved not more than 2 mm.

The operation voltage in the extent of the output charge from 2 pC to 5 pC is in the extent from 2.0 kV To 2.5 kV, and the problem of the breakdown voltages of the neutron position detector 11 and the processing circuit 13 does not occur.

According to the neutron position detection apparatus 10 using the neutron position detector 11, since the neutron position detector 11 is provided with the high voltage power supply 12 applying the operation voltage of 2.0 kV to 2.5 kV and the processing circuit 13 processing the output charge of 2 pC to 5 pC from the neutron position detector 11, the problem of the breakdown resistance does not occur and the position resolution can be improved.

In the AD converter using an element of 12 bit, a numerical value that can be expressed using the range up to ¼ is up to 1024, and 1 digit of the position resolution corresponds to about 1%. Conventionally, since the position resolution is approximately 0.5%, there exists the 5 times margin, however in the neutron position detection apparatus 10 according to the embodiment, the position resolution is not more than 2 mm to a sensitive length of 1 m, namely, the position resolution of 0.2% is obtained, and 12 bit is not sufficient. Then, by using an element having the resolution of 14 bit for the AD converter 15, correspondence to the neutron position detection apparatus 10 which the position resolution of 0.2% is obtained is possible.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A neutron position detector comprising:
   a tubular envelope serving as a cathode;
   an anode disposed on an axis in the envelope; and
   a gas including a $^3$He gas and an additive gas, the gas being enclosed in the envelope,
   the gas having a gas composition being set so that a total of ranges of a proton and a tritium in the gas produced by a reaction of a neutron incident into the envelope and the $^3$He gas is 2.0 to 2.7 mm, the partial pressures being in an extent surrounded by a first gas composition point of the partial pressure of the $^3$He gas of 5 atm and the partial pressure of the additive gas of 1.6 atm, a second gas composition point of the partial pressure of the $^3$He gas of 5 atm and the partial pressure of the additive gas of 2.3 atm, a third gas composition point of the partial pressure of the $^3$He gas of 20 atm and the partial pressure of the additive gas of 0.6 atm, and a fourth gas composition point of the partial pressure of the $^3$He gas of 20 atm and the partial pressure of the additive gas of 1.3 atm.

2. The neutron position detector according to claim 1, wherein
   the additive gas is a $CF_4$ gas.

3. The neutron position detector according to claim 1, wherein
   an operation voltage applied between the envelope and the anode is 2.0 to 2.5 kV.

4. The neutron position detector according to claim 3, wherein
   an output charge from the anode is 2 to 5 pC.

* * * * *

UNITED STATES PATENT AND TRADEMARK OFFICE
CERTIFICATE OF CORRECTION

PATENT NO. : 10,126,441 B1
APPLICATION NO. : 15/904834
DATED : November 13, 2018
INVENTOR(S) : Noriyuki Hikida et al.

Page 1 of 1

It is certified that error appears in the above-identified patent and that said Letters Patent is hereby corrected as shown below:

On the Title Page

Item (30), the Foreign Application Priority Data Information is incorrect. Item (30) should read:
-- (30)  Foreign Application Priority Data
May 15, 2017 (JP) ...............................2017-096171 --

Signed and Sealed this
Twenty-eighth Day of April, 2020

Andrei Iancu
*Director of the United States Patent and Trademark Office*